United States Patent [19]
Soltis

[11] 3,763,633

[45] Oct. 9, 1973

[54] ELECTROSTATIC AIR FILTER

[76] Inventor: Charles W. Soltis, 647 W. Forest, Houston, Tex.

[22] Filed: Feb. 9, 1971

[21] Appl. No.: 113,883

[52] U.S. Cl.................... 55/126, 55/131, 55/136, 55/139, 55/146, 55/155, 55/485, 55/486, 55/524, 55/525, 55/528
[51] Int. Cl............................................... B03c 3/41
[58] Field of Search.................... 55/528, 525, 124, 55/126, 131, 136, 137, 138, 139, 146, 155, 485, 486, 524

[56] References Cited
UNITED STATES PATENTS

| | | | |
|---|---|---|---|
| 2,822,058 | 2/1958 | Roos et al. | 55/131 |
| 2,933,151 | 4/1960 | Kurtz | 55/131 |
| 3,073,094 | 1/1963 | Landgraf et al. | 55/131 |
| 3,108,865 | 10/1963 | Berly | 55/138 |
| 3,307,332 | 3/1967 | Grace et al. | 55/131 |
| 3,400,520 | 9/1968 | Sakurai | 55/487 |
| 3,438,180 | 4/1969 | Klouda | 55/131 |
| 3,509,696 | 5/1970 | Thompson | 55/131 |

Primary Examiner—Bernard Nozick
Attorney—Kane, Dalsimer, Kane, Sullivan & Kurucz

[57] ABSTRACT

An air cleaner is provided comprising a filter assembly, an electrical power pack, and interconnecting high-voltage transmission means. The filter assembly is constructed of a filter unit having a prefilter and two layers of a dielectric filter media between which is sandwiched a positively charged grid. The filter assembly further includes a pair of negatively charged plates between which the filter unit is placed, and a header assembly molded of a rigid plastic and which is also provided with the male high-voltage receptacle and high-voltage contacts to the anode grid.

15 Claims, 5 Drawing Figures

PATENTED OCT 9 1973 3,763,633

INVENTOR
CHARLES W. SOLTIS
BY
ATTORNEYS

ELECTROSTATIC AIR FILTER

BACKGROUND OF THE INVENTION

In the field of residential as well as industrial air-conditioning systems, the consumer today can purchase an electrostatic air cleaner or a fiberglass air filter. Electrostatic air cleaners are currently manufactured and supplied by the Carrier Corporation, Honeywell Corporation as well as others. These units, however, have several disadvantages, namely, 1. installation costs are relatively high and extend to several hundred dollars:
2. the units are, as a rule, very bulky and will not fit in many systems; and
3. the collector cell must be removed and washed every 2 to 3 months.

Of course, essentially all central forced air heating and cooling systems are equipped with fiberglass filters, such as the type normally purchased at the local hardware store. Unfortunately, this unit is nothing more than a lint filter and is very inefficient in the one-to-ten micron range.

BRIEF SUMMARY OF THE INVENTION

The principal object of the present invention is an electrostatic air filter designed for operation is residential and small commercial air-conditioning systems which is adapted to replace standard one-inch fiberglass air filters.

Another object is to provide a filter than removes 90 percent and more of particles, one micron and larger, and, at the same time, is designed to fit into the same space as the standard one-inch fiberglass filter while maintaining high efficiency with a relatively low pressure drop.

A further object is to provide an electrostatic air filter employing a combination of electrostatic and mechanical filtration and the desirable characteristics of both by employing a multilayer charged media arrangement which offers the following advantages:

1. The filter unit is only one-inch thick and can fit into the same space as existing air-conditioning filters;
2. no duct modifications are required for installation;
3. a disposable synthetic fiber collector is employed which is very easily serviced; and
4. the filter is of significantly reduced cost.

A still further object of the filter of this invention is to provide effective relief through filtration in both residential and commercial buildings for allergy sufferers.

A still further object is to provide an electrostatic air filter that is adapted to operate at substantial reduction of ozone emission incident to ion generation as compared to the commercially available electronic air cleaners.

DESCRIPTION OF THE PREFERRED EMBODIMENTS

Figure 1:
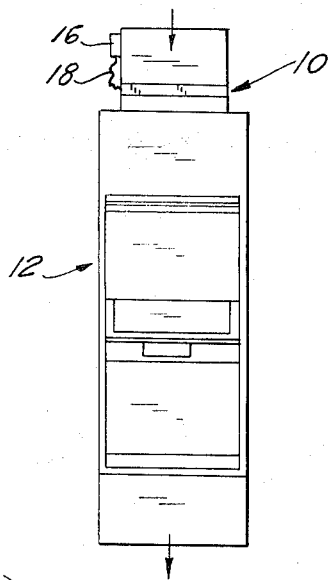
FIG. 1 is a perspective view of a representative air-heating or conditioning unit in which the electrostatic air filter of the present invention is incorporated.
Figure 3:
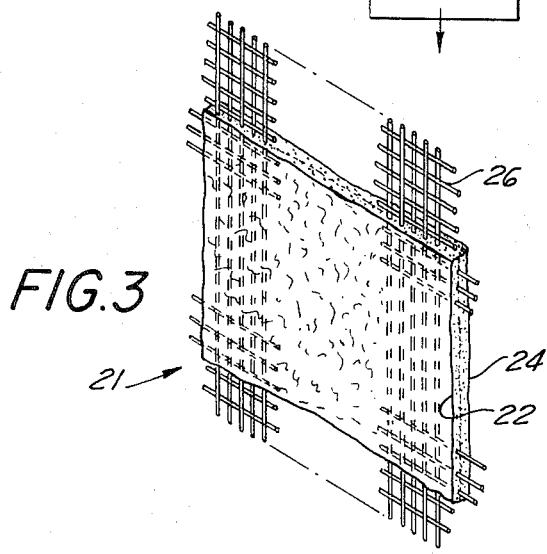
FIG. 3 is a fragmentary perspective view of a collection filter sandwich having filter media in which a wire screen is embedded.
Figure 5:
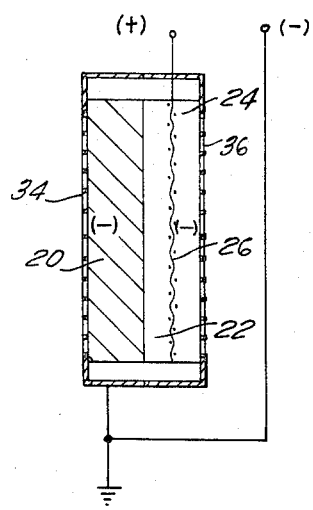
FIG. 5 is a diagrammatic view of the components shown in FIG. 4 illustrating the manner in which the desired electrostatic charge is generated for the desired ion flow within the filter assembly.
Figure 4:
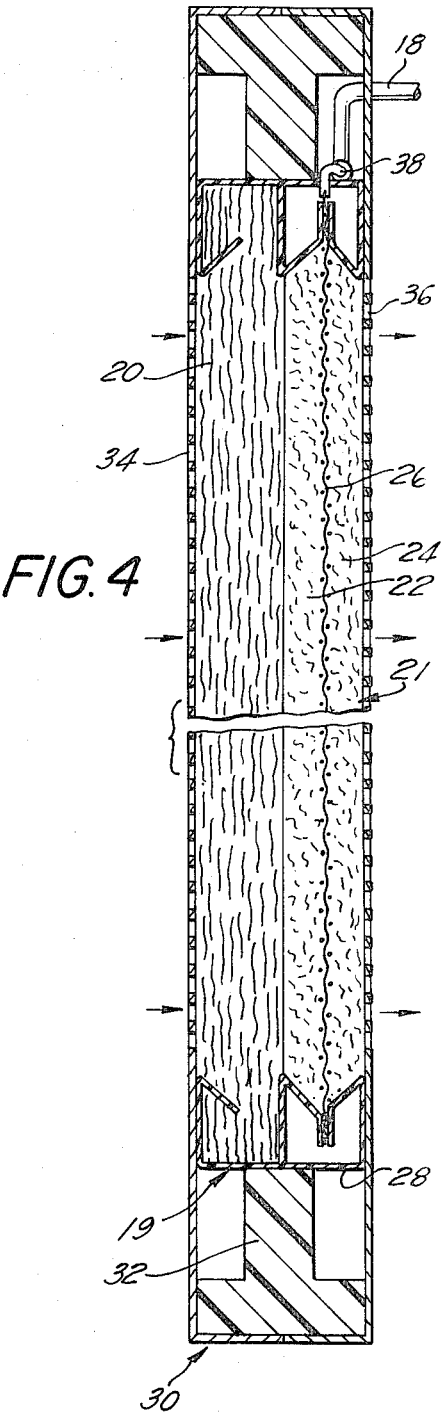
FIG. 4 is an enlarged longitudinal sectional view showing the complete filter assembly in which a conductive prefilter and two layers of dielectric filter media are associated with positively and negatively charged surfaces and a header assembly.
Figure 2:
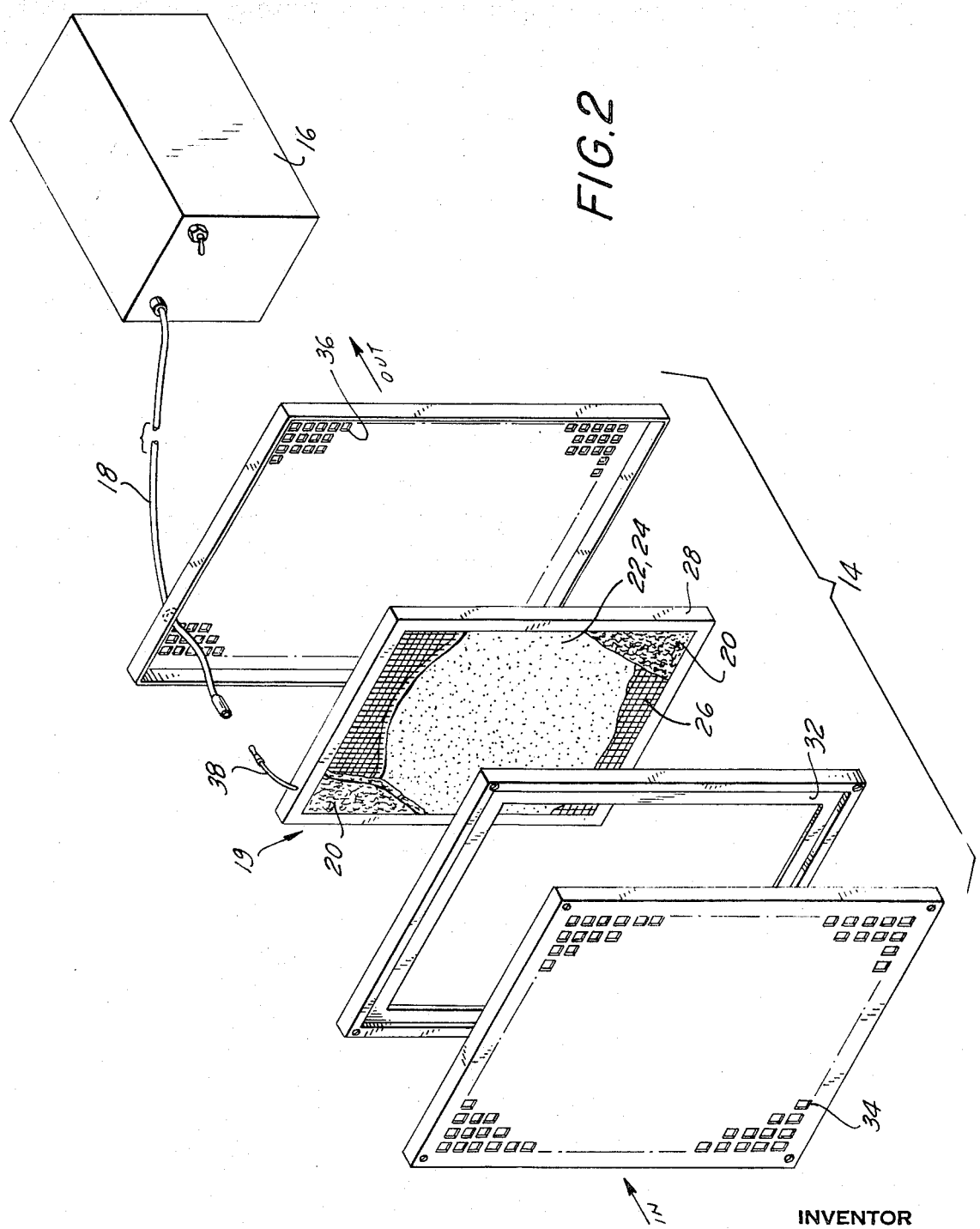
FIG. 2 is an exploded perspective view showing the components of the filter.

In the drawings, an electrostatic air cleaner 10 is shown operatively associated with an exemplary furnace 12 typical of the down-flow variety which, naturally, may be of the up-flow or horizontal design or, for that matter, unit 12 may be simply a residential, commercial or industrial air-conditioning system. Air cleaner 10, under any circumstances, will include a filter assembly 14, power pack 16 and interconnecting high-voltage power cable 18.

The filter assembly 14 is adapted to remove large dust and lint particles and very fine particles, one micron and larger. Specifically, this assembly will remove up to 90 percent or more of such particles including smog, dust, pollen, mold bacteria and other contaminants as well. Towards this end, the filter assembly 14 includes a filter unit 19 which has a conductive prefilter 20 for removing large dust and lint. This partially conditioned air then passes through the high-voltage ionizing field, causing the very fine particles to become charged and adhere to the filter media layers 22 and 24 of the collector pad or cell 21 of sandwich construction in which the filter media 22 and 24 sandwich interposed wire screen or grid 26 which is desirably made of fine wire to obtain optimum ion concentration. As will be evident to those skilled in the art, any one of the filter media 22 or 24 can be eliminated while still obtaining the desired ion flow. Both the prefilter 20 and filter media sandwich pad or cell 21 may have an individual or a common frame 28 whereby one may be removed or replaced but not the other. A housing 30 may also be provided as part of the assembly 14 and may include header 32 and opposed front and rear screens 34 and 36, respectively. Naturally, front screen 34 may be shifted to a location between prefilter 20 and filter media 22 if desired whereupon prefilter 20 need not be conductive. It is also contemplated that the opposed sides of the filter cell 21 may have a conductive surface of coating applied thereto instead of employing such screens.

In accordance with a successful embodiment of the present invention, the prefilter 20 of the filter assembly 14 embodied a nominal ½ inch thick expanded aluminum foil coated with any one of a number of commercially available sticky coatings where desired or necessary for optimizing the efficiency of the prefilter. In addition, the successful embodiment included approximately ¼ inch thick polyester fiber filter media layers 22 and 24 which sandwich interposed layer of 8 mesh commercially available screen wire serving as grid 26. Obviously, any type of dielectric material 22 and 24 may be employed and, towards this end, filter media layers 22 and 24 may assume the form of an open cell plastic foam material which has the added advantage of being washable as distinct from being replaceable in the case of the polyester type of filter sandwich cell 21.

As indicated, the front and rear screens 34 and 36 serve to hold the washable or disposable prefilter 20 and filter cell 21 in position in the air-conditioning unit. The front screen 34 is generally provided with larger openings than the back screen 36 which serves to allow large lint particles to penetrate into the aluminum foil prefilter 20. These front openings are approximately 3/4 inch squares in the stated successful embodiment. This size is not critical to the high-efficiency filter performance. On the other hand, the rear screen forms the leaving air negative ( − ) grid for the electrostatic filter and this screen is composed of 1/4 inch square openings. These openings could be smaller but it has been found that the optimum design is a balance between pressure drop and percent opening. If the metal web of this screen 36 is too far apart, then the ions do not flow well into the positive ( + ) grid 26 inside the filter media layers 22 and 24.

In accordance with another successful embodiment of the invention, the filter frame assembly included a perforated housing made from aluminum which was 64 percent open. The prefilter 20 was formed from expanded aluminum and the filter media was open cell polyester and, specifically, flexible polyurethane foam. The anode grid was 8 mesh galvanized steel wire. The header assembly was rigid polyvinyl chloride and the anode/grid spacers are a rigid polyvinyl chloride.

It has been found that the effective life of the total disposable filter 20 and filter cell 21 in the successful embodiment was approximately 2 to 3 months when operated in a normal residential air-conditioning unit. The total efficiency was approximately 90 percent and more reduction of one micron and larger particles which compares favorably with the more expensive electronic air cleaners that are commercially available. In addition, tests utilizing a Mast ozone meter indicated that the amount of ozone generated was negligible and no significant ozone build-up occurred over a 24 hour period. Furthermore, there was significant and convincing evidence of therapeutic benefit and advantage for allergy sufferers.

Referring now in more detail to the generation of the electrostatic field, it will be initially noted that a wire "pigtail" 38 is electrically connected to the wire screen or grid 26 and, at the same time, is adapted to be coupled with the high-voltage power lead 18 to the positive ( + ) side of the power pack 16. In accordance with the indicated successful embodiment, this pack 16 represented a 3,000 volt D.C. power source at 1 milliamp. Optimum conditions of arcing, ozone and filter efficiency has been found to generally occur between 2,500 volts and 3,500 volts. At this relatively low power level, the current is harmless even though the voltage is high. Power consumption is, accordingly, very low and thereby maintaining at a minimum the cost of operation of the pack 16. The negative line is grounded to the air-conditioning unit for safety. The front screen 34 and back screen 36 are connected to the cable 18 which may be two conductor co-axial power cable to the negative ( − ) side of the power pack 16. The negative ( − ) side of the power pack 16 is grounded, thus the entire system is ground with the exception of the positive ( + ) lead 38 to the grid 26. Inasmuch as the aluminum prefilter material 20 is electrically conductive, it comes into intimate contact with the front or air-entering screen 34, is also grounded and takes on a negative charge. The two layers of polyester media 22 and 24 are dielectric and "insulate" the positive grid 26 from the negative front and rear screens 34 and 36, respectively. When the disposable unit 19 is installed in the holding frame constituted by header 32 and front and rear screens 34 and 36, respectively, and the wire lead 38 is coupled with the power pack 16 through the cable 18, negative ions flow from the negative aluminum foil prefilter and the negative rear screen 36. The filter cell sandwich 21 is so designed that the polyester media 22 and 24 in the successful embodiment compresses slightly when installed to form a spacing of about three-sixteenths inch between the positive ( + ) grid 26 and the negative ( − ) surfaces. This spacing has been found to be fairly important if not critical inasmuch as too close spacing will cause arcing and too large spacing will severely reduce the ion flow.

When the negative ( − ) ions flow from the negative to the positive grid, they hit or strike the dust particles causing them to precipitate on the polyester media 22 and 24. The polyester media 22 and 24 forms a zig-zag path for the particles forcing them to cross back and forth across the path of the ions which are essentially flowing perpendicular to the grid surfaces and parallel to the air flow. The polyester media 22 and 24, because of its dielectric characteristics, forms a "capacitor-like" design on the surfaces of the media and become highly charged opposite to the surfaces next to the grid. The particles enter the negative field of the aluminum prefilter 20 and go through the first "ion shower" in the first layer 22 of the polyester media and begin to precipitate out on to this media. Those particles that do not stick enter the second "ion shower" in the second layer 24 of media and precipitate out on this media. An interesting characteristic of this embodiment is that the filter cell 21 becomes more efficient as the media 22 and 24 become dirty, presumably because the small particles cling to the fibers and enlarge the exposed surface for collecting the particles. This characteristic would appear to be opposite from a conventional electronic air cleaner which becomes less efficient as it gets dirty.

Thus, the several aforenoted objects and advantages are most effectively attained. Most important of all, the electrostatic air filter of the present invention offers the following advantages:

1. Compactness in that a high efficiency air filter is provided with a thickness of less than 1 inch.

2. Filter media and conductive grid design and disposition provide for highly efficient and effective "ion flow."

3. Disposable filter unit is possible as a result of the selection of materials that are relatively inexpensive.

4. Easy installation is provided in that the disposable filter unit may simply replace the lower efficiency commonly employed one-inch fiberglass filter.

5. Low pressure drop is experienced because the combination of filter materials and electronics permit maximum filtration within the pressure limits of the conventional residential air-conditioning system.

6. Filter unit configuration may assume different forms including that illustrated in drawings herein or may be in the form of a roll which may be turned to expose a new section thereof from time to time; or more than one filter unit or cell or perhaps more individual layers themselves may be employed to increase filter life and efficiency at a slightly higher pressure drop. In other words, modulation of filter media or cells are contemplated to obtain a multi-layer filter construction to satisfy certain commercial applications requiring filters 2 inches or 3 inches thick. In addition, the filter media, in such instances, may be foam of open cell construction with different pore sizes for adjusting or obtaining different pressure drop across the thickness of the filter.

Although several preferred embodiments of the invention have been disclosed and described in detail herein, it should be understood that this invention is in no sense limited thereby and its scope is to be determined by the appended claims.

I claim:

1. An electrostatic air filter comprising in combination: a filter unit having a first relatively thin layer of dielectric filter media, a second relatively thin layer of dielectric filter media disposed in close proximity to the first layer, electrode means including a fine wire grid interposed between and in close proximity with the first and second filter media, a pair of spaced conductive and chargeable surfaces on opposed sides of the dielectric layers away from the grid, a power pack for supplying a relatively high voltage at relatively low amperage to the filter unit, electrically conductive means for coupling the power pack to the filter unit, the positive side of said power pack being connected to said fine wire grid and the negative side of said power pack being connected to said chargeable surfaces whereby an imposed electrostatic high-voltage ionizing field across the filter causes ions to flow through the filter media and bombard very fine air-borne particles and simultaneously cause their precipitation out onto the media, and means for securing as an assembly the layers, interposed grid and chargeable surfaces.

2. The invention in accordance with claim 1 wherein the filter media is selected from the group consisting of polyester fibers and an open cell plastic foam filter material.

3. An electrostatic air filter comprising in combination: a filter unit having at least one relatively thin layer of dielectric filter media, conductive means including a fine wire grid in close proximity with the first filter media, a spaced conductive and chargeable surface on the opposite side of one of the filter media away from the grid, a power pack for supplying a relatively high voltage at relatively low amperage to the filter unit, electrically conductive means for coupling the power pack to the filter unit, the positive side of said power pack being connected to said fine wire grid and the negative side of said power pack being connected to said chargeable surface for cooperating in imposing an electrostatic high voltage ionizing field across the filter causing ions to flow through the filter media and bombard very fine air-borne particles and simultaneously cause their precipitation out onto the media, a prefilter means disposed in close proximity to one of the filter media and at the inlet side of the filter unit for filtering air passing through the pre-filter and removing air-borne large dust particles and lint, and means for securing as an assembly the layer, chargeable surface, grid and pre-filter.

4. The invention in accordance with claim 3 wherein a second relatively thin layer of dielectric filter media is disposed in close proximity to the first layer and the conductive means is interposed and in close proximity with the first and second filter media.

5. The invention in accordance with claim 4 wherein the pre-filter is conductive.

6. The invention in accordance with claim 4 wherein the prefilter is formed of expanded aluminum foil.

7. The invention in accordance with claim 4 wherein the prefilter and filter unit are positioned relative to one another by means of a peripherally extending frame.

8. The invention in accordance with claim 4 wherein the prefilter is aluminum foil approximately one-half inch thick and each of the filter media is of polyester fiber and is one-fourth inch thick and the grid is formed from a single layer of 8 mesh screen wire.

9. The invention in accordance with claim 4 wherein the electrostatic filter unit is adapted to remove at least 90 percent of the particles 1 micron and larger from the airstream.

10. The invention in accordance with claim 4 wherein a pair of electrically conductive perforated plates are spaced from one another and have interposed therebetween the prefilter and filter unit.

11. The invention in accordance with claim 10 wherein a non-conductive header is disposed about the periphery of the prefilter and filter unit and between the conductive perforated plates to dispose and position the prefilter and filter unit in a predetermined relationship between the perforated plates.

12. The invention in accordance with claim 11 wherein means are provided for electrically coupling the spaced screens and grid to a relatively high-voltage low-amperage power source and imposing upon the plates a negative charge and the grid a positive charge whereupon ions are adapted to flow from the front plate through the electrically conductive prefilter through one layer of dielectric filter media to the positive grid and ions adapted to flow from the rear plate to the adjacent dielectric filter material to the positive grid, the ions adapted to bombard the air-borne particles of the airstream being filtered causing the particles to precipitate out on to the filter media.

13. The invention in accordance with claim 12 wherein the power source is adapted to supply voltage between 2,500 volts and 3,500 volts.

14. The invention in accordance with claim 13 wherein the power source supplies 3,000 volts D. C.

15. The invention in accordance with claim 10 wherein the front screen has larger openings than the back screen and the openings of the front screen are approximately ¾ inch squares and the openings in the rear screen are approximately ¼ inch squares.

* * * * *